(12) United States Patent
Novick

(10) Patent No.: US 6,822,939 B2
(45) Date of Patent: Nov. 23, 2004

(54) METHOD AND APPARATUS FOR GUARANTEEING A MINIMUM CELL RATE (MCR) FOR ASYNCHRONOUS TRANSFER MODE (ATM) TRAFFIC QUEUES

(75) Inventor: Ronald P. Novick, Orange, CT (US)

(73) Assignee: Transwitch Corporation, Shelton, CT (US)

( * ) Notice: Subject to any disclaimer, the term of this patent is extended or adjusted under 35 U.S.C. 154(b) by 198 days.

(21) Appl. No.: 10/151,617

(22) Filed: May 20, 2002

(65) Prior Publication Data

US 2003/0214952 A1 Nov. 20, 2003

(51) Int. Cl.[7] ............................ H04J 3/14; H04L 12/56; H04L 12/28
(52) U.S. Cl. ................ 370/230.1; 370/236; 370/395.42; 370/412; 370/468
(58) Field of Search ............................. 370/230, 230.1, 370/232–234, 235, 235.1, 236, 395.1, 395.4, 395.41, 395.42, 395.43, 395.61, 412, 413, 414, 418, 468

(56) References Cited

U.S. PATENT DOCUMENTS

| | | | |
|---|---|---|---|
| 5,150,358 A | 9/1992 | Punj et al. ................... | 370/418 |
| 5,231,633 A | 7/1993 | Hluchyj et al. ............. | 370/429 |
| 5,280,475 A | 1/1994 | Yanagi et al. ............... | 370/399 |
| 5,339,332 A | 8/1994 | Kammerl .................... | 375/225 |
| 5,381,407 A | 1/1995 | Chao .......................... | 370/233 |
| 5,400,329 A | 3/1995 | Tokura et al. .............. | 370/232 |
| 5,448,567 A | 9/1995 | Dighe et al. ................ | 370/233 |
| 5,497,375 A | 3/1996 | Hluchyj ...................... | 370/232 |
| 5,499,238 A | 3/1996 | Shon .......................... | 370/399 |
| 5,504,744 A | 4/1996 | Adams et al. .............. | 370/468 |
| 5,515,359 A | 5/1996 | Zheng ........................ | 370/230 |
| 5,559,798 A | 9/1996 | Clarkson et al. ........... | 370/468 |
| 5,561,791 A | 10/1996 | Mendelson et al. ........ | 709/233 |
| 5,787,071 A | 7/1998 | Basso et al. ................ | 370/231 |
| 5,889,761 A | 3/1999 | Yamato ...................... | 370/231 |
| 5,940,370 A | 8/1999 | Curtis et al. ................ | 370/231 |
| 6,115,358 A | 9/2000 | Jones ......................... | 370/232 |
| 6,327,246 B1 | 12/2001 | Jones ......................... | 370/232 |

*Primary Examiner*—Chau Nguyen
*Assistant Examiner*—Soon-Dong Hyun
(74) *Attorney, Agent, or Firm*—Gordon & Jacobson, PC

(57) ABSTRACT

An apparatus for guaranteeing MCR in an ATM device includes at least one queue for each service category, a scheduler for dequeuing cells from the queues, a queue status block for indicating which queues are empty, and an MCR service block. The MCR service block includes a plurality of timers, at least one for each service category. According to the methods of the invention, an MCR value is selected for each queue (or service category) and a timer in the MCR service block is set according to the MCR value. The scheduler dequeues cells in strict priority from non-empty queues as determined by the queue status block. The scheduler is preempted, however, by the MCR service block when a queue fails to be serviced before its associated timer expires. The arrangement of queues and associated timers is subject to alternate embodiments.

16 Claims, 3 Drawing Sheets

METHOD AND APPARATUS FOR GUARANTEEING A MINIMUM CELL RATE (MCR) FOR ASYNCHRONOUS TRANSFER MODE (ATM) TRAFFIC QUEUES

BRIEF DESCRIPTION OF THE APPENDIX

The enclosed CD-ROM appendix is incorporated herein by to reference. The CD-ROM is in ISO 9660 Macintosh® format and includes the following Adobe® Acrobat® files:

| List of files | Size (Bytes) | Date of Creation |
| --- | --- | --- |
| SCB_FR.pdf | 252,958 | Apr. 12, 2002 |

The file SCB_FR.pdf is a document entitled "Aspen Express Scheduler Block (SCB) Requirements Specification" which illustrates in detail a presently preferred embodiment of the invention.

BACKGROUND OF THE INVENTION

1. Field of the Invention

The invention relates to the allocation of bandwidth in an ATM (Asynchronous Transfer Mode) network. More particularly, the invention relates to methods and apparatus for guaranteeing a minimum cell rate (MCR) or a sustained cell rate (SCR) in ATM traffic queues.

2. State of the Art

Perhaps the most awaited, and now fastest growing technology in the field of telecommunications is known as Asynchronous Transfer Mode (ATM) technology. ATM was designed to be a carrier of integrated traffic, e.g. voice, data, and video. ATM utilizes fixed length packets (called "cells") of 53 octets (5 octets header and 48 octets payload). Current ATM service is offered in different categories according to a user's needs. These categories include, in order of priority: constant bit rate (iCBR), variable bit rate-real time (VBR or VBR-rt), variable bit rate-non-real time (VBR-nrt), guaranteed frame rate (GFR), available bit rate (ABR), unspecified bit rate plus (UBR+), and unspecified bit rate (UBR). CBR and VBR-rt are "real-time" categories suitable for streaming video and voice connections. These categories are given the highest priority in the ATM network. The other five categories are considered "non-real-time". For GFR, ABR, and UBR+, users pay for a minimum cell rate (or guaranteed frame rate) which is an average rate taken over time during which there may be bursts up to a specified peak cell rate (PCR). For convenience, these three categories are referred to as MCR (minimum cell rate) services. According to ATM Forum standards, both VBR-rt and VBR-nrt require a "sustained cell rate" (SCR) which is substantially the same requirement as MCR. For UBR, no minimum bandwidth is guaranteed. UBR connections are serviced last if there is any available bandwidth after servicing all of the higher categories of service. UBR, is referred to as "best effort" service. Service categories and traffic management issues are specified in the ATM Traffic Management Specification Version 4.1, AF-TM-0121.000, March 1999.

ATM traffic management systems vary in complexity and cost. The simplest method of managing traffic is strict priority queuing. According to strict priority queuing, each traffic flow (virtual circuit or virtual path) is assigned a service category bulk queue. These queues are then serviced in strict priority order. The more complex systems assign a separate queue to each traffic flow and shapes each one according to a specific traffic contract so that it meets a required SCR or MCR and does not exceed a PCR (peak cell rate) and limits the cell delay variation (burstiness).

The strict priority mechanism is quite simple and inexpensive to implement but provides only minimum quality of service (QOS) since there are no individual guarantees for each traffic flow. Also, the lowest categories of service are subject to starvation with no guarantee of any service at all. The shaping mechanisms provide all the necessary guarantees for individual traffic flows but shaping mechanisms are very complex and costly to develop.

SUMMCRY OF THE INVENTION

It is therefore an object of the invention to provide methods and apparatus for guaranteeing MCR or SCR in ATM traffic queues.

It is also an object of the invention to provide methods and apparatus for guaranteeing MCR or SCR in ATM traffic queues which guarantees MCR or SCR in each traffic flow of an ATM device.

It is another object of the invention to provide methods and apparatus for guaranteeing MCR or SCR in ATM traffic queues which prevents starvation of lower service categories.

It is a further object of the invention to provide methods and apparatus for guaranteeing MCR or SCR in ATM traffic queues which are relatively simple and inexpensive to implement as compared to known traffic shaping systems.

In accord with these objects which will be discussed in detail below, the apparatus of the present invention includes at least one queue for each service category, a scheduler for dequeuing cells from the queues, a queue status block for indicating which queues are empty, and an MCR service block. The MCR service block includes a plurality of timers, at least one for each service category. According to the methods of the invention, an MCR value is selected for each queue (or service category) and a timer in the MCR service block is set according to the MCR value. The scheduler dequeues cells in strict priority from non-empty queues as determined by the queue status block until a timer expires. When a timer expires, it is determined whether any queues associated with the timer failed to receive service during the timer interval. If such "starved queues" exist, the scheduler is preempted by the MCR service block so that the starved queues receive service. The arrangement of queues and associated timers is subject to alternate embodiments. As stated above, at least one queue is provided for each service category. However, according to an alternate embodiment, separate queues for each traffic flow are implemented. According to still another embodiment, multiple queues are implemented for some service categories, e.g. three separate priority queues for UBR service so that different classes of IP traffic can be mapped into UBR traffic. As stated above, at least one timer is provided for each service category. When a timer expires, the scheduler is directed to service all of the unserviced queues in the associated service category. According to an alternate embodiment, a separate timer is associated with each queue. The invention may be implemented in either a single port or multi-port device.

Additional objects and advantages of the invention will become apparent to those skilled in the art upon reference to the detailed description taken in conjunction with the provided figures.

DETAILED DESCRIPTION OF THE PREFERRED EMBODIMENTS

Figure 1:
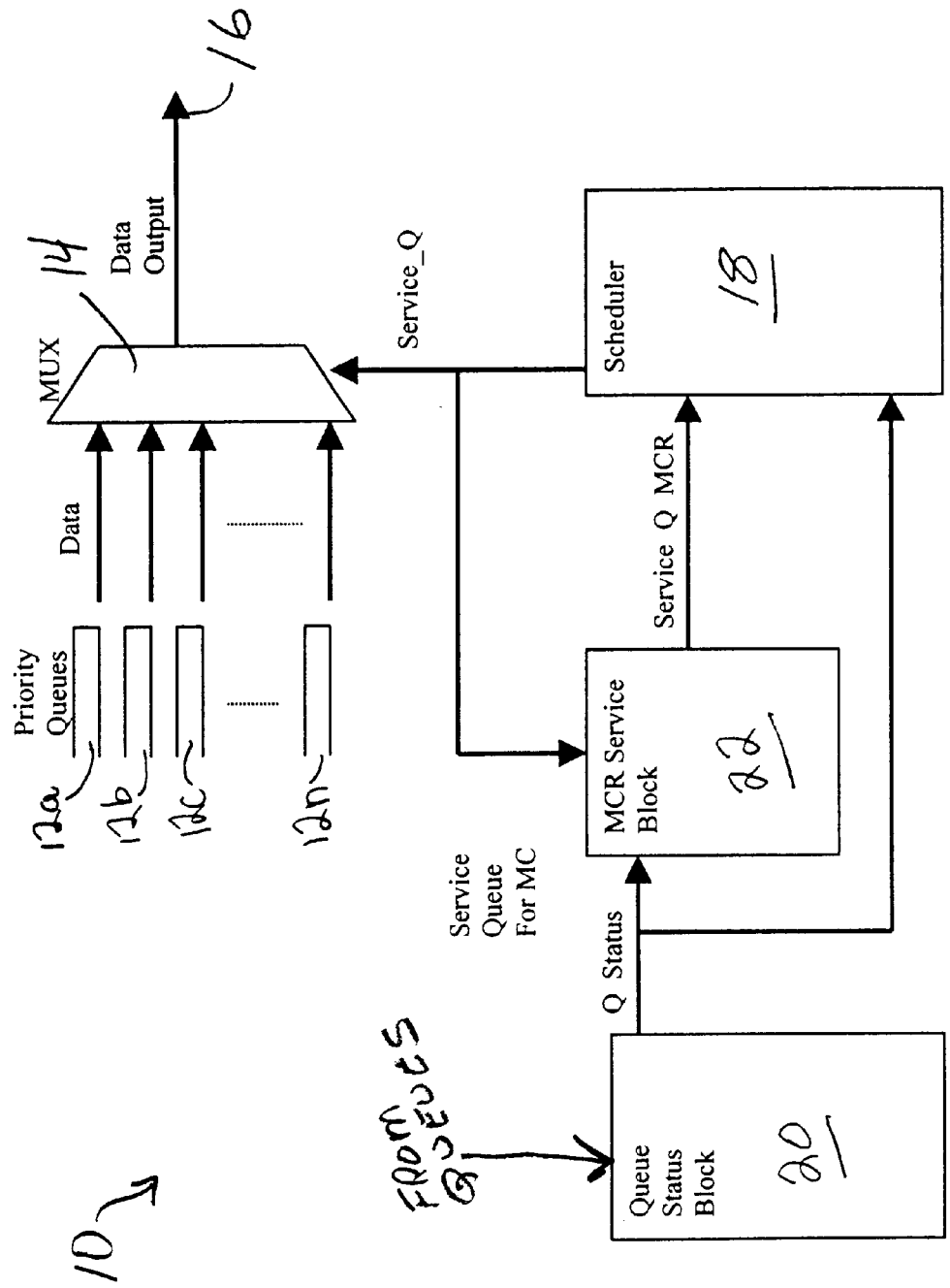
FIG. 1 is a simplified block diagram of an apparatus according to the invention.

Referring now to FIG. 1, an apparatus 10 according to the invention includes a plurality of queues 12a, 12b, 12c, ..., 12n, feeding to a multiplexer 14 having a single port output 16. Although not shown in FIG. 1, an apparatus according to the invention could have multiple output ports and the methods described below takes into consideration multiple ports. A scheduler 18 controls the dequeuing of cells from the queues 12a, 12b, 12c, ..., 12n by controlling the multiplexer 14. A queue status block 20 receives status information from the queues 12a, 12b, 12c, ..., 12n and provides status information to the scheduler 18. The queue status block is preferably an n-bit word or vector where n is the number of queues. Each bit indicates whether the associated queue is empty (e.g. 0=empty, 1=not empty). The scheduler 18 reads the queue status block 20 when servicing the queues 12a, 12b, 12c, ..., 12n, and ignores the empty queues. The number of queues is at least equal to the number of service categories supported by the apparatus 10. With the minimum number of queues, all traffic flows in the same service category share the same queue. Alternatively, separate queues may be provided for each traffic flow or some service categories may be provided with a single queue while others are provided with multiple queues. An example of an implementation in which multiple queues are set up for a single service category is when mapping different classes of IP service into UBR traffic. In any event, according to the methods of the invention, an MCR or SCR is associated with each queue requiring such and all of the queues in the same service category are associated with the same MCR or SCR.

According to the presently preferred embodiment the MCR or SCR is expressed as a number of clock ticks during which at least one cell must be sent from this queue. For example, if a minimum cell rate (MCR) of 1,000/sec is desired and the clock used is a 100 MHz clock then the MCR value is 100,000.

Figure 2:
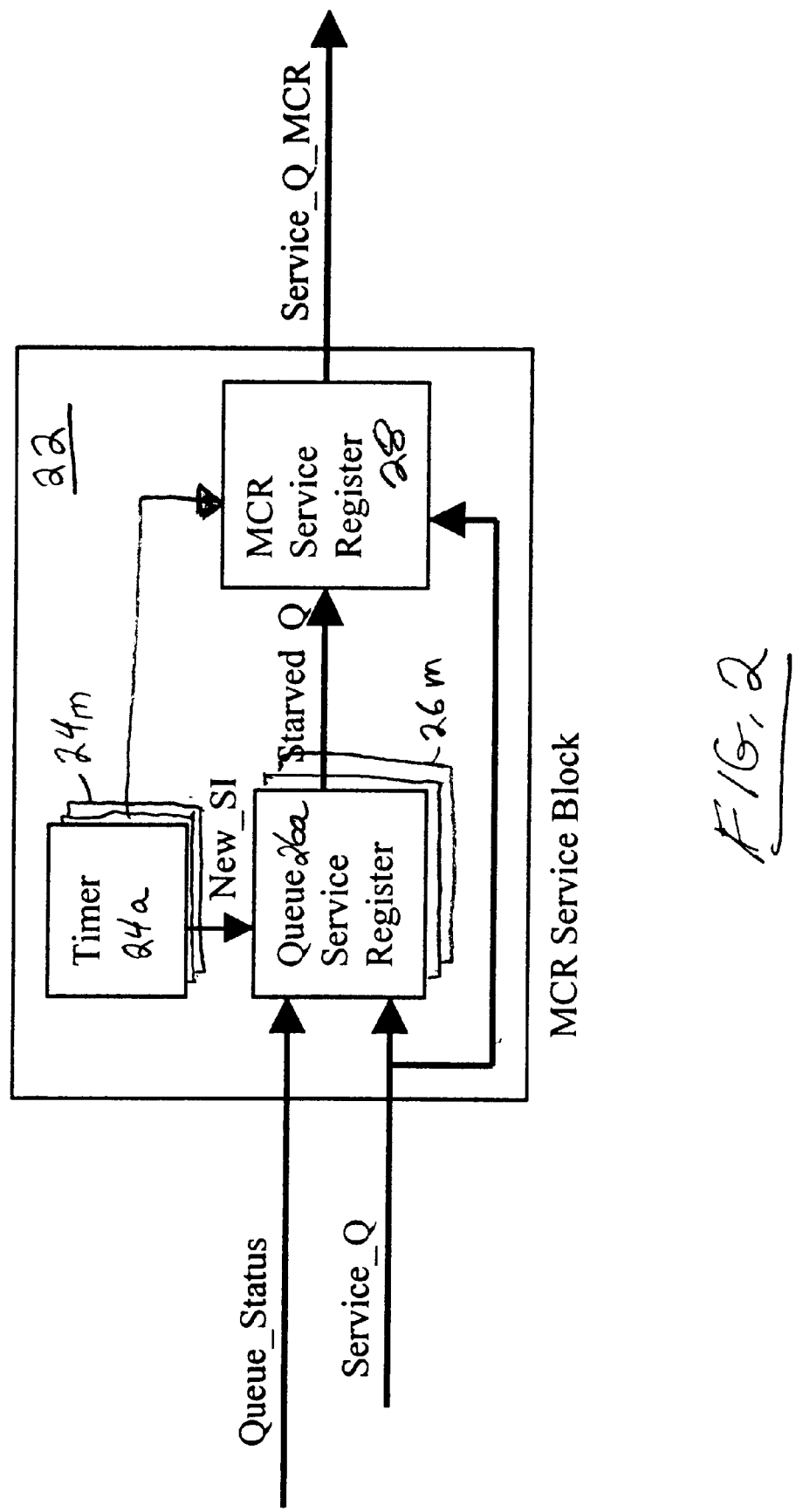
FIG. 2 is a simplified block diagram of the MCR Service Block of FIG. 1.

According to the invention, an MCR service block 22 is coupled to the scheduler 18 and the queue status block 20. FIG. 2 illustrates the main components of the MCR service block 22. The MCR service block 22 includes a plurality of timers 24a–24m, a corresponding plurality of queue service registers 26a–26m and an MCR service register 28. The number of timers is at least equal to the number of service categories. It will be appreciated, however, that the number of timers may be fewer than the number of queues.

Referring to FIGS. 1 and 2, the general operation of the apparatus includes the queue status block 20 supplying a queue status signal to the queue service registers 26a–26m. The queue status signal is a word indicating which queues are not empty. This word is latched into the queue service registers 26a–26m when the timers 24a–24m are started. It will be appreciated that the queue status word includes the status of all queues whereas each queue service register refers to a subset of the queues. As the scheduler 18 services queues, it generates a service_q signal which is sent to the multiplexer 14, the queue service registers 26a–26m, and the MCR service register 28. The service_q signal alters the bits in the queue service registers to indicate which queues have been serviced. For example, when the queue status word is generated a 1 bit is used to indicate a non-empty queue. As queues are serviced, the 1 bits are zeroed. When a timer expires, the queue service register associated with the timer is latched into the MCR service register 28. This represents a list of "starved queues". The MCR service register then signals the scheduler to service the starved queues.

Figure 3:
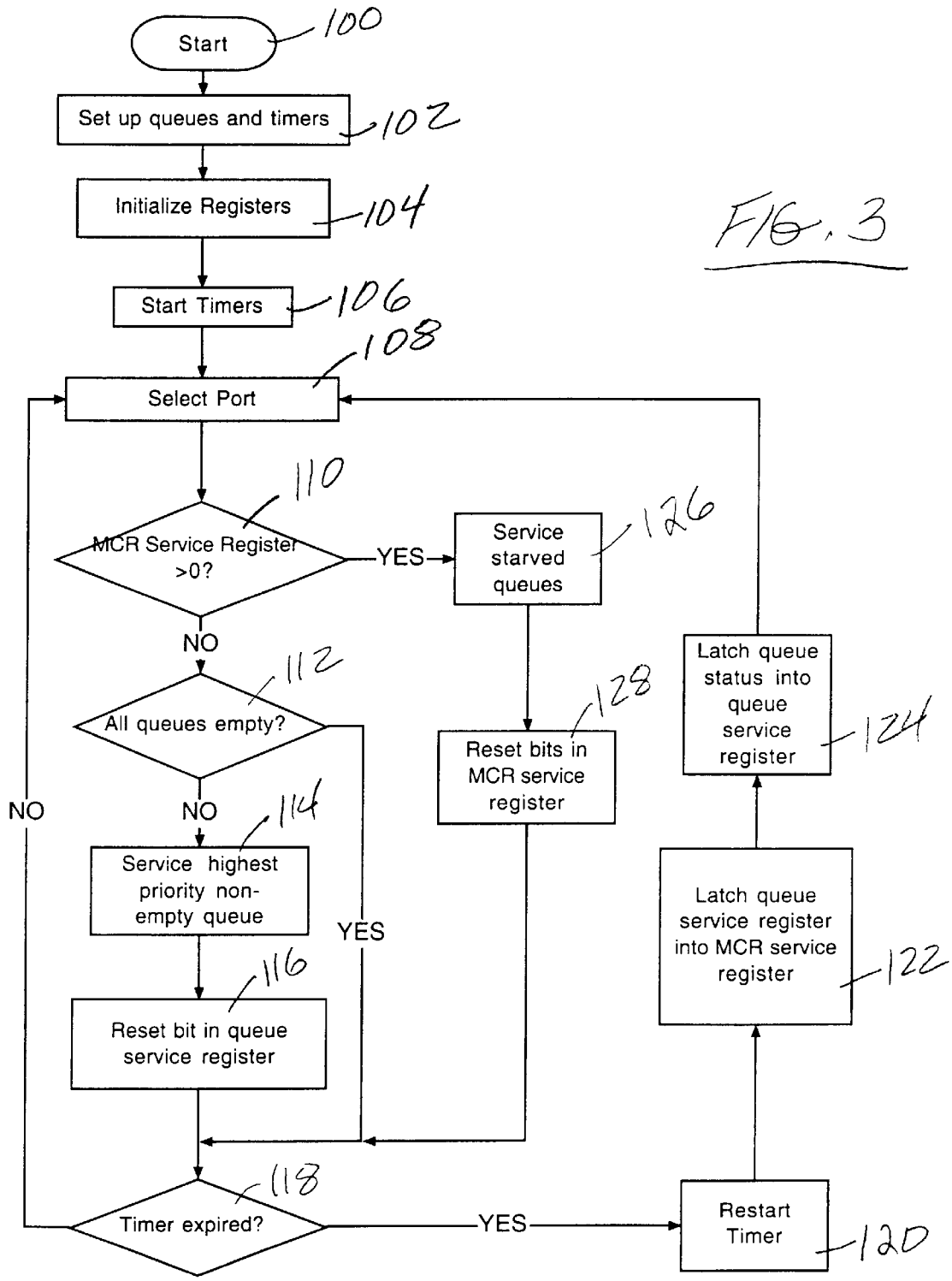
FIG. 3 is a simplified flowchart illustrating the methods of the invention.

FIG. 3 illustrates a presently preferred embodiment of the methods of the invention as applied to a multiport device. Starting at 100, queues and timers are set up at 102. The queue service registers and the MCR service register are initialized at 104 and all timers are started at 106. An egress port is selected at 108 and the MCR service register associated with that port is checked at 110. If the MCR service register is empty, the queues associated with the selected port are checked at 112. If there is at least one non-empty queue, the queue with highest priority is serviced at 114. The bit in the queue service register associated with the serviced queue is then reset at 116 to indicate that the queue was serviced. At 118 it is determined whether any of the timers associated with this port have expired. If no timers have expired, the next port is selected at 108 and the process is repeated.

If it is determined at 118 that a timer has expired, the expired timer is restarted at 120, the queue service register is latched into the MCR service register at 122 and the queue service register is updated at 124.

If it is determined at 110 that the MCR service register lists unserviced (starved) queues, the starved queues are serviced at 126 and the MCR service register is reset to zero at 128.

The methods described in FIG. 3 are also illustrated in the previously incorporated appendix and in particular at section 4.3 of the appendix.

There have been described and illustrated herein several embodiments of methods and apparatus for guaranteeing a minimum cell rate for asynchronous transfer mode traffic queues. While particular embodiments of the invention have been described, it is not intended that the invention be limited thereto, as it is intended that the invention be as broad in scope as the art will allow and that the specification be read likewise. For example, while it is preferred that there be at least one queue per service category and at least one timer per service category, it is possible that there be fewer timers, e.g. one timer per MCR class(es) of service. It will therefore be appreciated by those skilled in the art that yet other modifications could be made to the provided invention without deviating from its spirit and scope as so claimed.

What is claimed is:

1. An apparatus for guaranteeing minimum cell rate (MCR) in an asynchronous transfer mode (ATM) device, said apparatus comprising:
   a) a first plurality of queues, at least one for each service category;
   b) a scheduler coupled to said queues for dequeuing cells from said queues in order of priority;
   c) at least one timer associated with at least one of said queues; and
   d) preemption means coupled to said at least one timer and to said scheduler for preempting said scheduler, wherein
      said preemption means always causes said scheduler to dequeue a cell from said at least one queue associated with said at least one timer whenever said at least one timer expires if a cell from said at least one queue associated with said at least one timer is not dequeued by said scheduler before said timer expires.

2. An apparatus according to claim 1, wherein:

said at least one timer includes at least one timer for each class of service.

3. An apparatus according to claim 1, wherein:

said preemption means includes an MCR service register for indicating which queues are to be serviced when said at least one timer expires.

4. An apparatus according to claim 1, wherein:

said preemption means includes at least one queue service register for indicating which queues have been serviced.

5. An apparatus according to claim 2, wherein:

said preemption means includes a queue service register associated with each timer for indicating which queues have been serviced before the timer expires.

6. An apparatus according to claim 2, wherein:

said preemption means includes an MCR service register for indicating which queues are to be serviced when a timer expires.

7. An apparatus according to claim 4, wherein:

said preemption means includes an MCR service register for indicating which queues are to be serviced when a timer expires.

8. An apparatus according to claim 5, wherein:

said preemption means includes an MCR service register for indicating which queues are to be serviced when a timer expires.

9. A method for guaranteeing minimum cell rate (MCR) in an asynchronous transfer mode (ATM) device, said method comprising:

a) establishing at least one queue for each service category;

b) dequeuing cells from the queues in order of priority;

c) establishing at least one timer associated with at least one of said queues; and d) always dequeuing a cell from the at least one queue associated with the at least one timer whenever the at least one timer expires if no cells have been dequeued from the at least one queue associated with the at least one timer before the timer expires.

10. A method according to claim 9, wherein:

said step of establishing at least one timer includes establishing at least one timer for each class of service.

11. A method according to claim 9, further comprising:

e) establishing an MCR service register for indicating which queues are to be serviced when the at least one timer expires.

12. A method according to claim 9, further comprising:

e) establishing at least one queue service register for indicating which queues have been serviced.

13. A method according to claim 10, further comprising:

e) establishing a queue service register associated with each timer for indicating which queues have been serviced before the timer expires.

14. A method according to claim 10, further comprising:

e) establishing an MCR service register for indicating which queues are to be serviced when a timer expires.

15. A method according to claim 11, further comprising:

f) establishing at least one queue service register for indicating which queues have been serviced.

16. A method according to claim 13, further comprising:

f) establishing an MCR service register for indicating which queues are to be serviced when a timer expires.

* * * * *